INVENTORS
GEORGE I. BOYADJIEFF
KENNETH W. VERGE

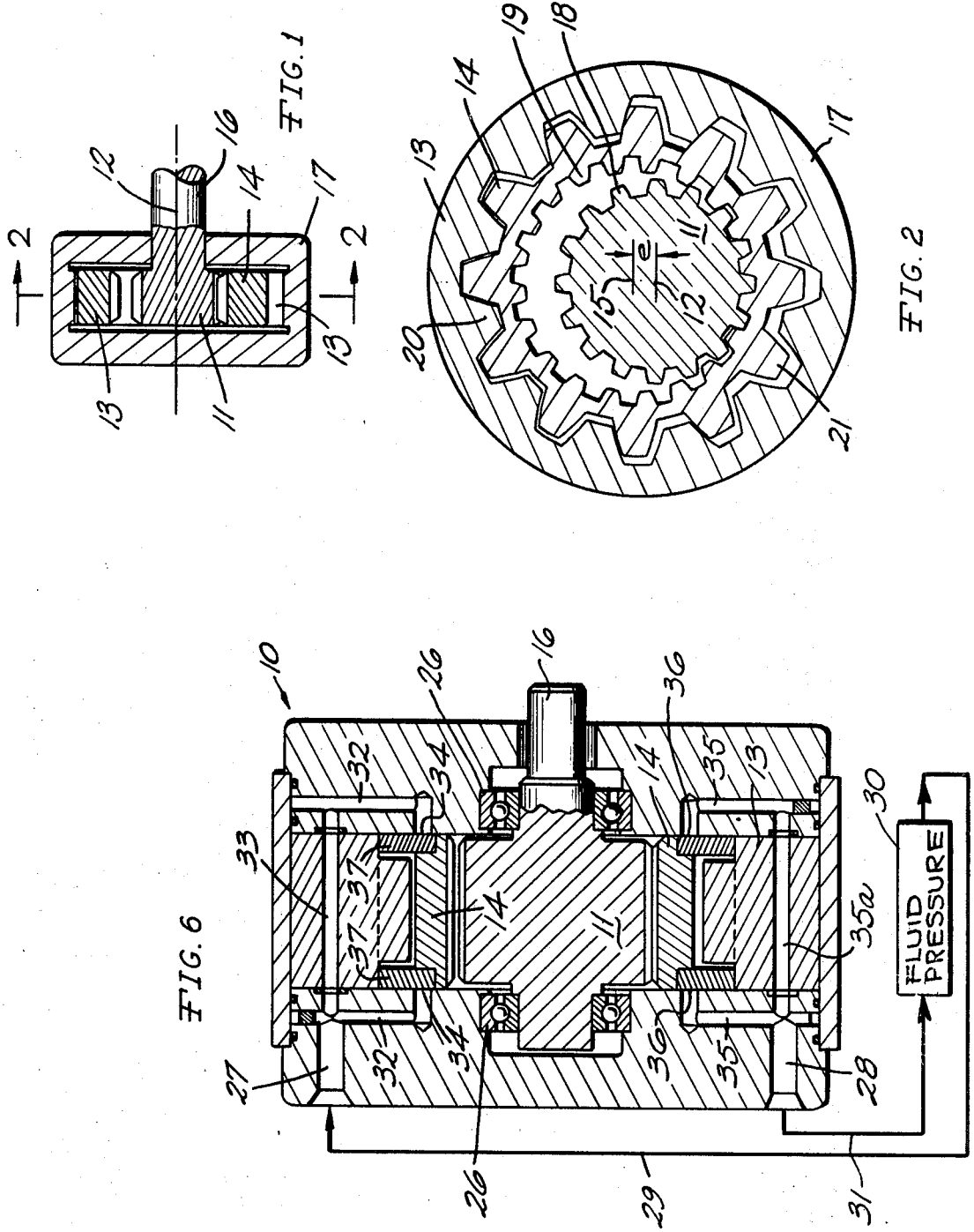

ATTORNEY

INVENTORS
GEORGE I. BOYADJIEFF
KENNETH W. VERGE

ATTORNEY

June 23, 1970  G. I. BOYADJIEFF ET AL  3,516,765

FLUID ACTUATED ACTUATOR

Filed Oct. 30, 1967  7 Sheets-Sheet 4

INVENTORS
GEORGE I. BOYADJIEFF
KENNETH W. VERGE

BY James L. O'Brien

ATTORNEY

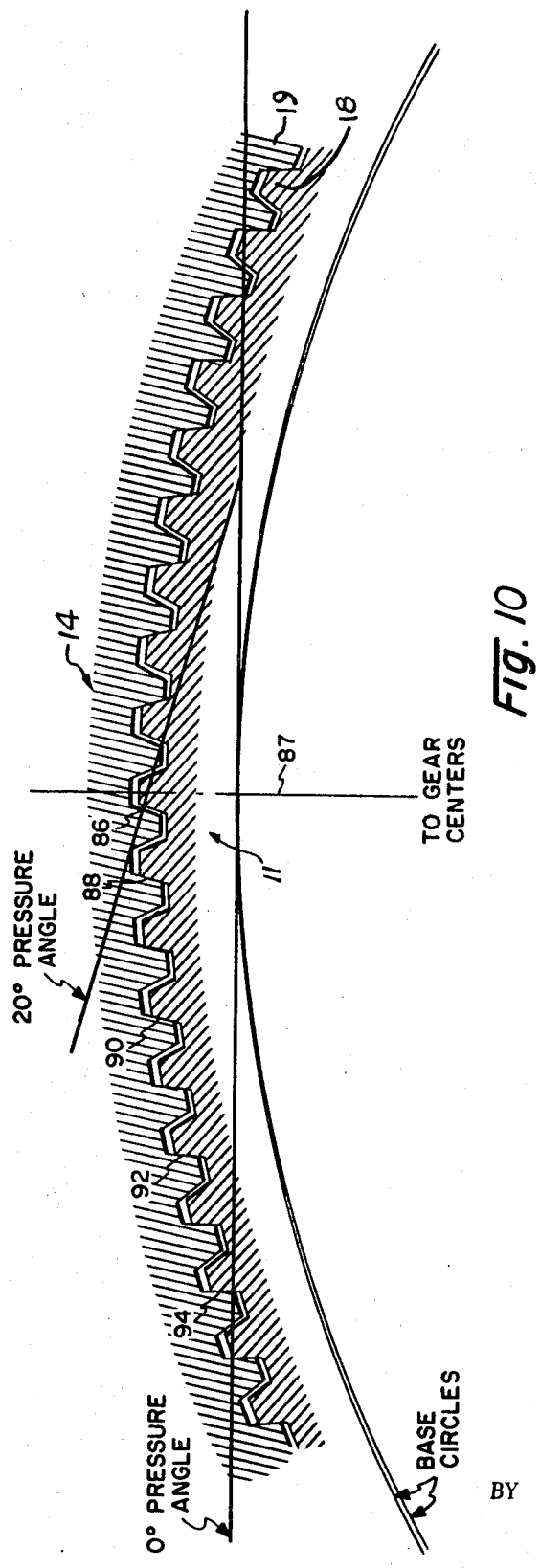

INVENTOR.
GEORGE I. BOYADJIEFF
KENNETH W. VERGE
BY
ATTORNEY

United States Patent Office 3,516,765
Patented June 23, 1970

3,516,765
FLUID ACTUATED ACTUATOR
George I. Boyadjieff, Farmington, and Kenneth W. Verge, Pontiac, Mich., assignors to The Bendix Corporation, a corporation of Delaware
Continuation-in-part of application Ser. No. 523,111, Jan. 26, 1966. This application Oct. 30, 1967, Ser. No. 678,951
Int. Cl. F01c 1/10, 3/00; F04c 3/00
U.S. Cl. 418—61                    30 Claims

ABSTRACT OF THE DISCLOSURE

A fluid actuated integrated motor-transmission unit in which an output gear and a concentric stationary gear coact with a driven eccentric ring gear that meshes therewith to provide for a direct drive of the output gear by driving the ring gear so that the axis thereof orbits about the output gear axis. The ring gear is driven by sequentially pressurizing and exhausting a series of fluid displacement chambers, and both self-commutating and externally commutated forms of the unit are disclosed.

CROSS REFERENCE TO RELATED APPLICATIONS

This application is a continuation-in-part of copending application Ser. No. 523,111 filed Jan. 26, 1966, now abandoned. Actuators of the general type to which this invention relates are also disclosed in copending applications Ser. No. 667,459 filed Sept. 13, 1967 and Ser. No. 670,726 filed Sept. 26, 1967.

BACKGROUND OF THE INVENTION

The actuator of this invention is an integrated motor-transmission unit which is driven by fluid under pressure and in which a desired transmission ratio is an integral part of the structure. A rotating radial force vector is utilized as the driving force to obtain rotational output movement. The prior art motor shown in U.S. Pat. No. 3,117,244 employs radial forces to obtain gyration or orbiting-type movement of a motor component, but the structure disclosed in this patent requires a flexible joint in order to translate this gyration into useful rotary movement. In the actuator of this invention, the output member is driven directly by an orbiting ring gear so that useful rotary motion is obtained directly concurrently with the achievement of a desired transmission ratio. Fluid powered motors are also well known but such motors require large input forces while the actuator of this invention can be operated directly with low input forces such as the output from a fluid amplifier.

SUMMARY OF THE INVENTION

The actuator of this invention includes three basic components, as follows:

(1) An output gear mounted for rotation about its axis and usually connected to an output shaft.

(2) A stationary gear mounted in a fixed position with respect to the output gear and in a concentric relation therewith.

(3) A ring gear which is eccentric with respect to the output gear axis and has two sets of teeth, one set meshing with the stationary gear and the other set meshing with the output gear.

The ring gear is mounted for "floating" movement, namely, movement in which the axis of the gear moves so that the gear does not move about a fixed center. The portions of the ring gear which mesh with the stationary and output gears enables the stationary gear to apply a reaction force to the ring gear which in turn enables the ring gear to apply an output force to the output gear causing it to rotate.

The motor input is a force vector applied to the ring gear at a position angularly spaced from the reaction and output forces so as to cause the ring gear axis to orbit about the axis of the output gear, with the ring gear experiencing epicyclic movement relative to both the output and stationary gears. The ring gear orbits in a small circle having a radius equal to the eccentricity of the ring gear relative to the output gear, this eccentricity being only a small fraction of the ring gear diameter. Since the center of mass of the ring gear must therefore be moved only in a small circle, the polar moment of inertia of the ring gear (mass times radius squared) is small compared to most conventional motors. This reduces the force necessary to accelerate or decelerate the moving portions of the motor. As a result, the motor of this invention is particularly adapted for controlled drives where changes in motor output velocity must be frequent and rapid, and the motor can be operated directly with the output from a single fluid amplifier.

The motor input force vector is produced in a series of fluid displacement chambers located around or within the ring gear. The force vector is created by pressurizing one or more of the chambers on one side of the ring gear while exhausting the chambers on the other side. In the self-commutating form of the actuator of this invention, the ring gear, during its orbiting movement successively changes the porting to the displacement chambers so that one is being changed from pressure to exhaust while another is switching from exhaust to pressure, thus causing the force vector to rotate. The actuator components are arranged so that the force vector is spaced in a direction circumferentially of the ring gear from the points at which the ring gear engages the stationary and output gears to thus continually obtain the desired orbiting movement of the ring gear axis and epicyclic movement of the ring gear so long as there is a fluid pressure input to the actuator.

In one form of the actuator of this invention, the ring gear has the same number of teeth as the stationary gear so that the ring gear will move in an epicyclic path and the axis will orbit without the gear rotating. This construction facilitates self-commutation of the motor and design flexibility from the standpoints of size and transmission ratios. The displacement chambers are formed in the actuator of this invention by vanes which oscillate over short distances as the ring gear is moved. Since this oscillation is confined to short distances, there are no high rubbing velocities as in a conventional vane motor. The actuator has a supply passage for fluid and a discharge passage. To effect reversed rotation of the actuator, it is only necessary to reverse the functions of these passages, such as by use of an external valve.

The actuator of this invention can be manufactured in very small size in relation to the torques obtained because high contact ratios between engaged gear teeth surfaces can be achieved since the ring gear does not rotate about a fixed center. Furthermore, the actuator of this invention can be manufactured at a relatively low cost compared to available structures capable of performing the same functions, since the actuator of this invention is both a motor and a transmission. By suitable arrangement of the ring gear pitch diameters, transmission ratios can be obtained between the force vector and the output shaft which vary between 7:1 and 2000:1. One important advantage of the actuator of this invention is that it requires bearings only for the output shaft, thereby eliminating the necessity for bearings rotating at high speed. This enables use of the actuator of this invention in environments wherein conventional motor-transmission units cannot be used. Another important advantage of the actuator of this invention is that it can be operated directly by fluidics devices, such as fluid amplifiers, thereby enabling the conversion of fluid pressure outputs to rotary motion outputs in environments wherein this result could heretofore not be achieved.

It is an object of this invention, therefore, to provide an improved actuator of the above-described type.

Further objects, features, and advantages of this invention will become apparent from a consideration of the following description, the appended claims, and the accompanying drawing in which:

FIG. 1 is a diagrammatic illustration showing the arrangement of the basic components in one form of the fluid powered actuator of this invention;

FIG. 2 is a diagrammatic illustration showing the components as they would appear looking substantially along the line 2—2 in FIG. 1;

FIG. 6 is another sectional view of the actuator illustrated in FIGS. 3–5, inclusive, and illustrating diagrammatically the assembly therewith of a fluid pressure source;

Figure 9:
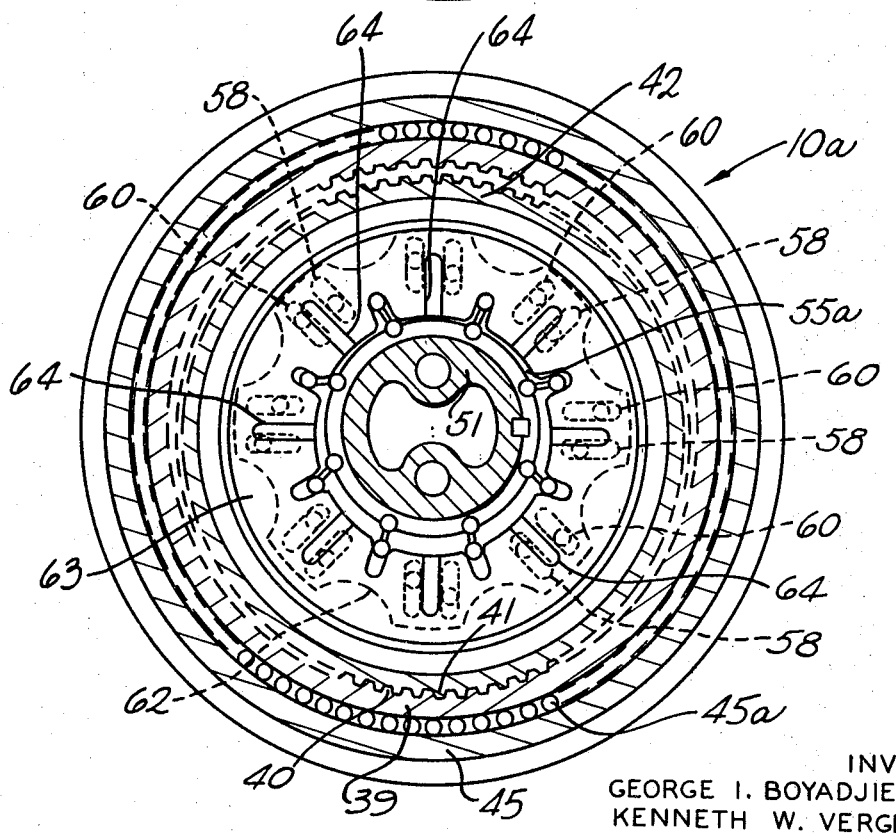
Figure 7:
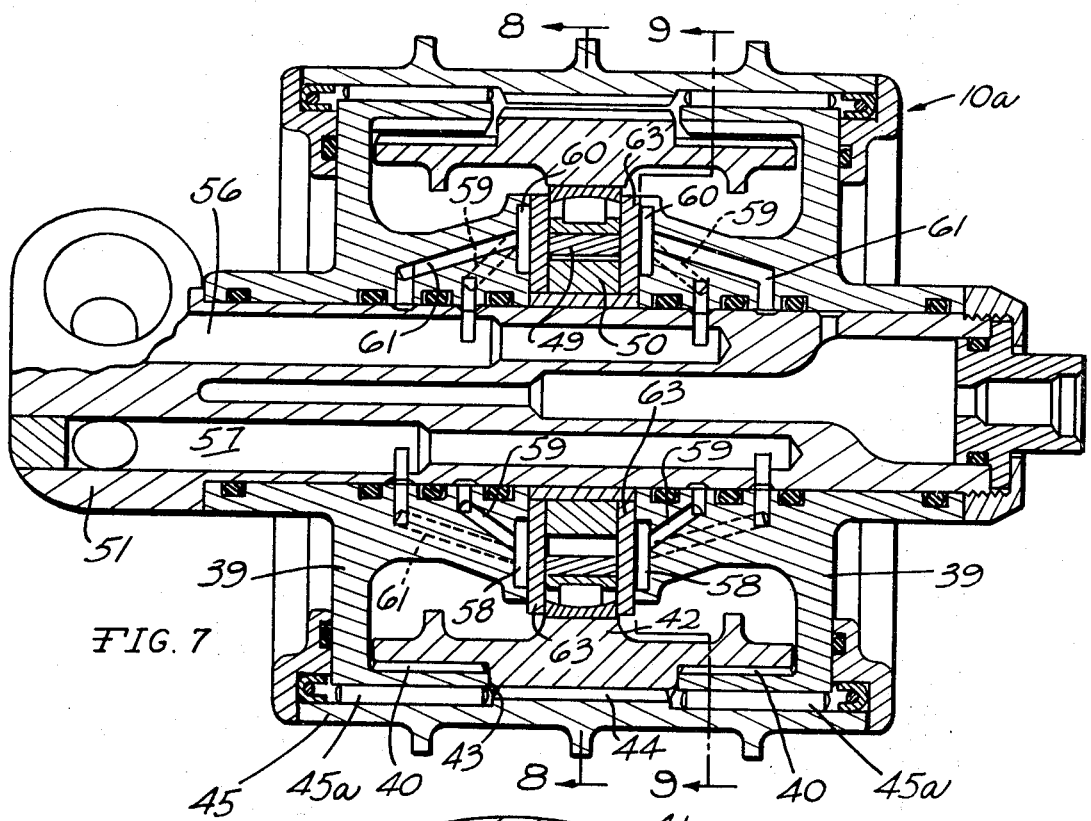
FIG. 7 is a longitudinal sectional view of another form of the actuator of this invention.
Figure 8:
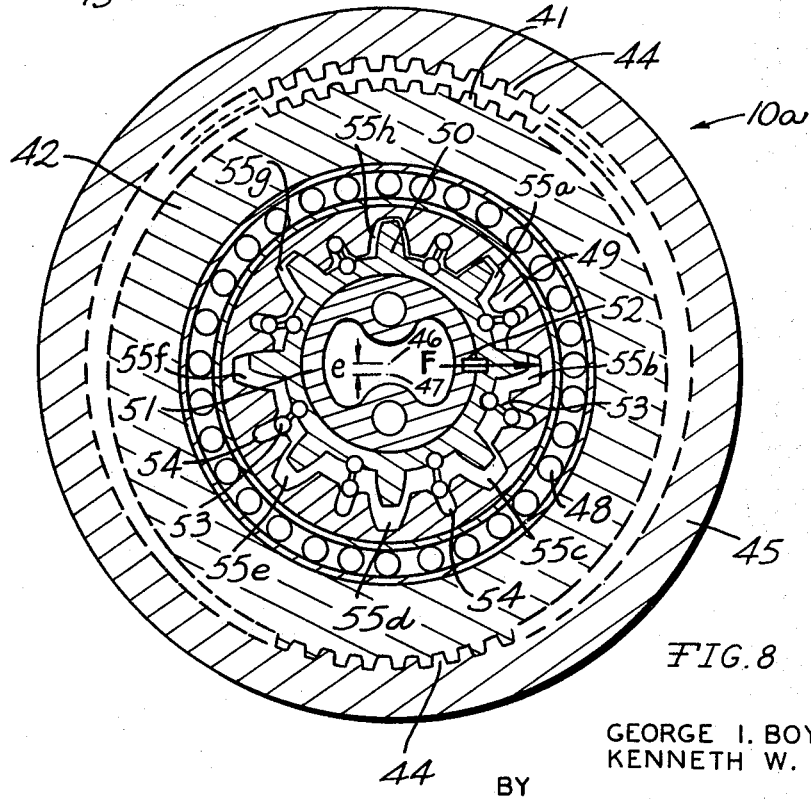
Figure 12:
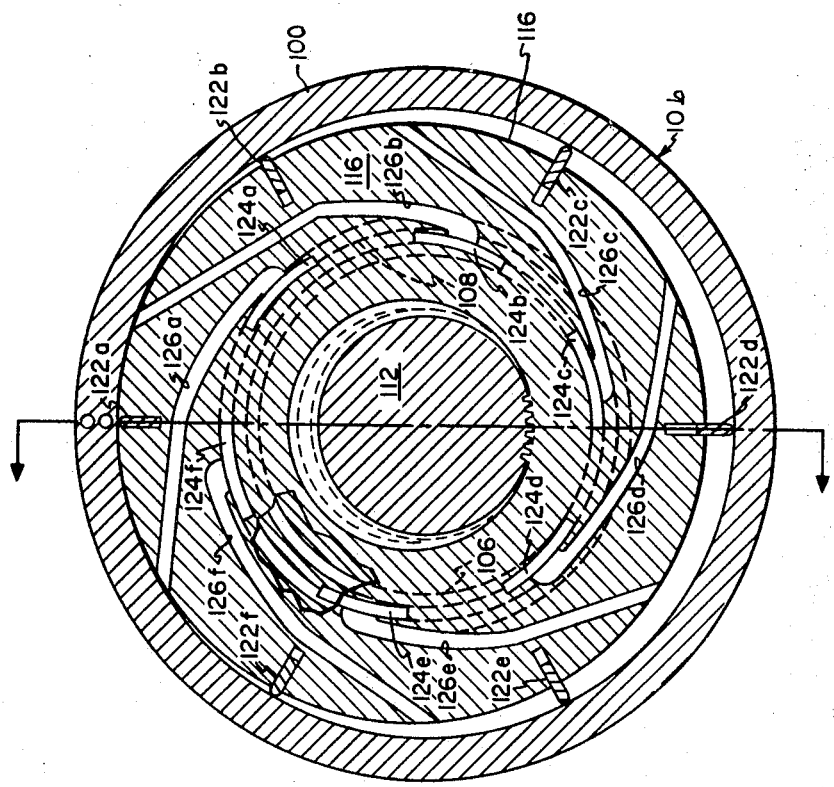
Figure 11:
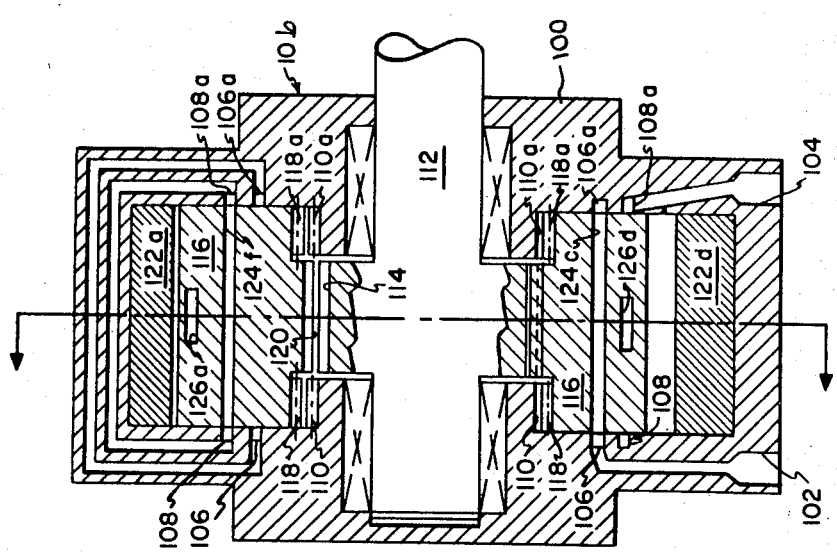
Figure 13:
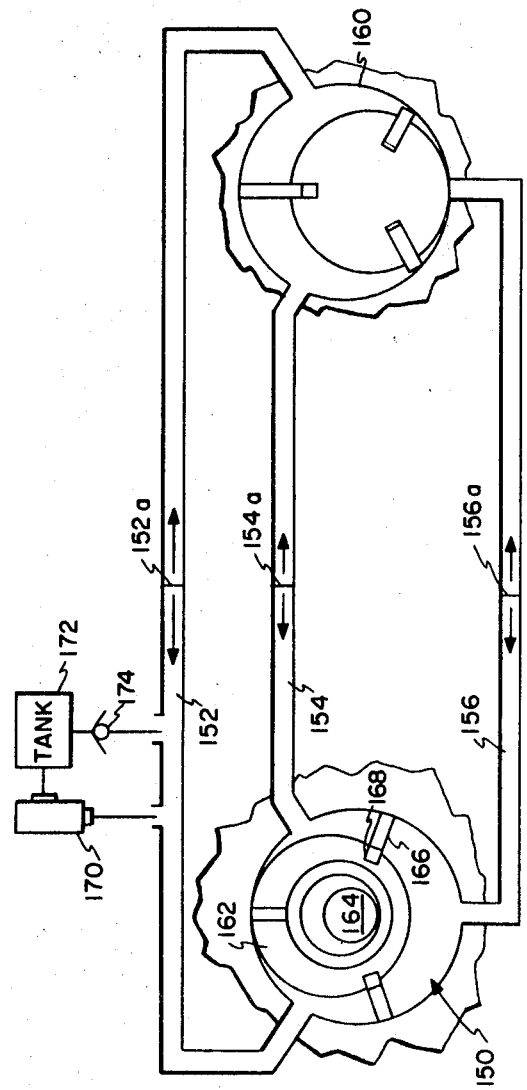

FIGS. 8 and 9 are transverse sectional views, looking along the lines 8—8 and 9—9, respectively, in FIG. 7 of the form of the actuator illustrated therein;

FIG. 10 is an enlarged sectional view of portions of an output gear and a ring gear in the actuator of this invention illustrating the meshing engagement thereof;

FIG. 11 is a sectional view of still another form of the actuator of this invention, as seen from substantially the line 11—11 in FIG. 12;

FIG. 12 is a sectional view of the form of the actuator of this invention shown in FIG. 11, as seen from substantially the line 12—12 therein; and FIG. 13 is a schematic view illustrating the assembly of a pair of actuators of this invention wherein one of the actuators is driven by an external power source and it provides the drive and external commutation for the other actuator.

With reference to the drawing, the actuator of this invention, indicated generally at 10, is illustrated in FIGS. 1 and 2 as consisting of three basic components, namely, an output gear 11 mounted for rotation about its axis 12, a stationary gear 13 which is maintained in a fixed position relative to the output gear 11 and is concentric therewith, and a floating ring gear 14 having an axis 15 which is eccentric with respect to the output gear axis 12 and is therefore offset therefrom by the distance indicated at e. The output gear 11 is illustrated as being attached to an output shaft 16 and the stationary gear 13 is illustrated as being affixed to a housing 17. The output gear 11 is formed with teeth 18 which mesh with a set of internal teeth 19 on the ring gear 14, and the stationary gear 13 is provided with teeth 20 which mesh with external teeth 21 on the ring gear 14.

The motor 10 is driven by applying an externally generated rotating force vector to the ring gear 14 so as to cause the ring gear 14 to move in an epicyclic path relative to the output gear 11 and the stationary gear 13 and cause the ring gear axis 15 to orbit in a circle having the radius e about the axis 12. Since the ring gear 14 has the same number of teeth 21 as the teeth 20 on the stationary gear 13, the ring gear 14 cannot rotate relative to the stationary gear 13, but since the pitch circle on which the teeth 14 are disposed has a diameter less than the diameter of the pitch circle on which the teeth 20 are disposed, the ring gear 14 can be moved in an epicyclic path so that the imaginary axis 15 or center of mass thereof can move in a circle about the axis 12. In the event the force vector applied to the ring gear 14 is directed substantially radially inwardly of the stationary gear 13 and is rotated in a clockwise direction about the axis 12 the ring gear axis 15 will be moved in a clockwise direction about the output gear axis 12. As a result of the meshing engagement of the output gear teeth 18 and the ring gear teeth 19, this orbiting movement of the ring gear 14 will result in counterclockwise rotation of the output gear 11. This coaction of the gears 11, 13 and 14 to provide for the desired rotary movement of the output gear 11 is explained in greater detail in the aforementioned copending application Ser. No. 667,459 in connection with an actuator in which the ring gear rotates as well as orbits with respect to the output gear 11.

Figure 3:
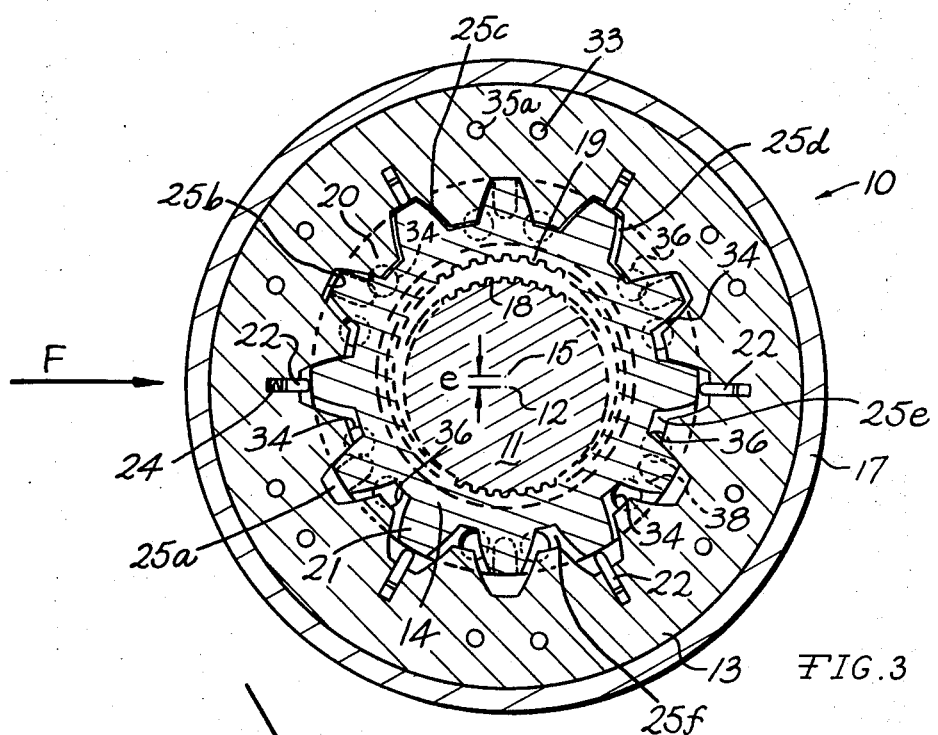
FIG. 3 is a sectional view of a structural form of the actuator of this invention showing the gear components in the positions in which they are arranged when the input force vector is located in the position indicated by the external arrow.
Figure 4:
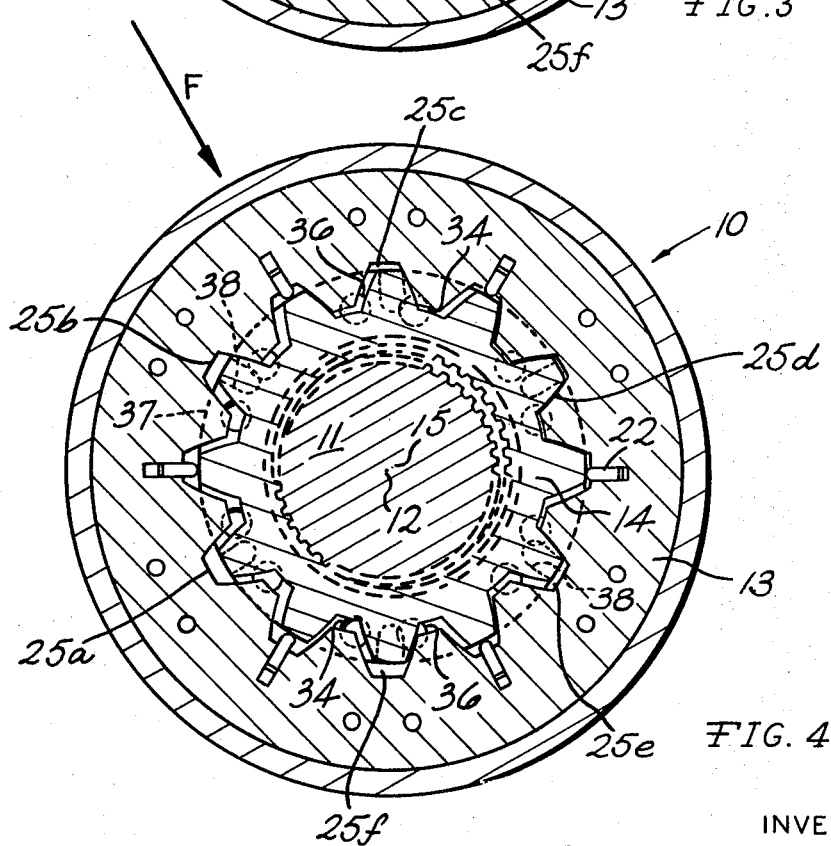
FIGS. 4 and 5 are sectional views, like FIG. 1, showing the actuator components in successively moved positions resulting from movement of the input force vector to the successive positions indicated by the external arrows in FIGS. 4 and 5.
Figure 5:
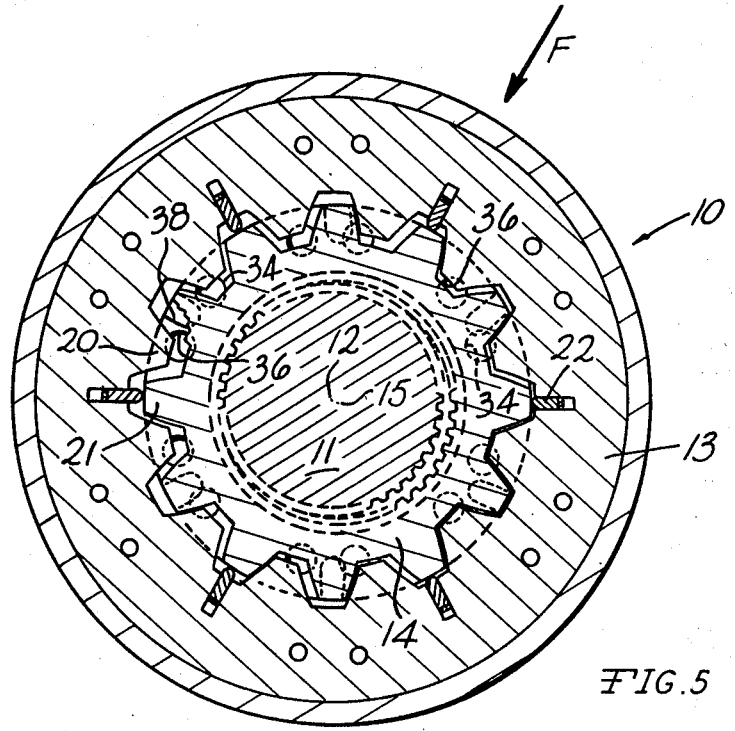

A structural embodiment of the actuator 10 illustrated diagrammatically in FIGS. 1 and 2 is shown in FIGS. 3–6, inclusive, in which the same numerals are used to indicate the actuator components. As shown in FIG. 3, a series of vanes 22, illustrated as being six in number, are slidably supported in slots 23 in the stationary gear 13 and each is urged by means such as a spring 24, only one of which is shown, radially inwardly so that at their inner ends, the vanes 22 continuously engage certain of the ring gear teeth 21 and are maintained in substantially fluid tight relation therewith. As a result, a series of six displacement chambers 25a–f, inclusive, are formed about the ring gear 14 with each of the chambers 25a–f extending between a pair of adjacent vanes 22. By sequentially pressurizing one or more of the displacement chambers on one side of the ring gear 14 and exhausting a corresponding number of chambers on the opposite side of the ring gear, a force vector F is applied to the ring gear 14, with the force vector F rotating about the axis 12 as illustrated in FIGS. 3–5, inclusive. For example, in FIG. 3, the chambers 25a and 25b are pressurized and the chambers 25d and 25e are exhausted, with the chambers 25c and 25f being connected to neither pressure nor exhaust. This results in a force vector F being applied in substantially the direction illustrated in FIG. 3 to the ring gear 14 at a position substantially midway between the ends of the combined chambers 25a and 25b. The arrow representing the force vector F is shown outside the actuator 10 only for convenience of illustration, it being understood that the arrow F indicates the vector resulting from the pressure in the chambers 25a and 25b which is applied to the ring gear 14.

In FIG. 4, the chambers 25b and 25c are pressurized and the chambers 25e and 25f are exhausted. In FIG. 5, the chambers 25c and 25d are pressurized and the chambers 25f and 25a are exhausted. It can thus be seen that by successively pressurizing and exhausting successive chambers extending in a clockwise direction, the force vector F can be made to rotate continuously about the axis 12 so as to effect epicyclic movement of the ring gear 14 in which the axis 15 thereof moves about the output gear axis 12.

The structure providing for sequential pressurizing and exhausting of the displacement chambers 25a–f, inclusive, is illustrated in FIG. 6. As shown in FIG. 6, the actuator housing 17 carries bearings 26 which support the output shaft 16 for rotation about its axis 12. The housing 17 is also provided with a fluid inlet passage 27 and a fluid exhaust passage 28. The inlet passage 27 is connected by a conduit 29 to the output side of a fluid pressure source 30, such as a pump or a fluid amplifier, and the exhaust passage 28 is connected to the inlet side of the fluid pressure source 30 by a conduit 31. The inlet passage 27 communicates with passages 32 formed in the housing 17 on opposite sides of the ring gear 14 which are in turn connected by connecting passages 33 formed in the stationary gear 13 so that fluid in the passages 32 is at the same pressure. The passages 32 terminate in axially aligned pressure fluid discharge ports 34 which correspond in number of pairs to the number of displacement chambers 25a–f, inclusive. Thus in the illustrated embodiment of the invention, there are six pairs of pressure fluid discharge ports 34.

The discharge passage 28 likewise communicates with passages 35 in the housing 17 which are connected by cross passages 35a in the stationary gear 13. The passages 35 terminate in fluid inlet ports 36 which are arranged in pairs and correspond in number of pairs to the number of discharge ports 34. Thus, as shown in FIGS. 3–5, inclusive, each of the displacement chambers 25a–f, inclusive, is provided with a pair of pressure fluid inlet ports 34 and a pair of fluid discharge ports 36, only one of the ports in each pair appearing in FIGS. 3–5.

Each pair of ports 34 and 36 in the housing 17 is positioned so that they can be blocked by a pair of side plates 37 which are secured to the ring gear 14 for movement therewith. The plates 37 are provided with aligned pairs of slots or openings 38 which are positioned so that they can register with the ports 34 and 36 which are arranged in a circular formation extending about the output gear axis 12. The plates 37 are provided with pairs of slots 38 corresponding in number to the number of displacement chambers, namely, six in the illustrated embodiment of the invention. Thus, when the slots 38 for one of the displacement chambers communicate with the pressure ports 34 for that chamber, the chamber is supplied with fluid under pressure. Likewise, when the slots 38 for a chamber are in communication with the discharge ports 36, for that chamber, fluid can flow out of the chamber through the ports 36. When the slots 38 for a chamber communicate with neither the pressure ports 34 nor the discharge ports 36, the ports 34 and 36 are blocked by the plates 37 so that fluid can neither enter nor flow out of the chamber. In the position of the ring gear shown in FIG. 3, the slots 38 for the chambers 25a and 25b communicate with the pressure ports 34 for those chambers so that the chambers are supplied with fluid under pressure. The slots 38 for the chambers 25d and 25e on the diametrically opposite side of the ring gear 14 communicate with the discharge ports 36 so that fluid can flow out of these chambers through the conduit 31 to the fluid pressure source 30. The slots 38 for the chambers 25c and 25f do not communicate with either the ports 34 or the ports 36 so that fluid is neither supplied to nor discharged from these chambers at this time. As a result, the fluid pressure force on the ring gear 14, in the position thereof illustrated in FIG. 3, will move the ring gear 14 to the right as illustrated in FIG. 3. Progressively moved positions of the ring gear 14 are illustrated in FIGS. 4 and 5 from which it is seen that the slots 38 communicate with the ports 34 and 36 so as to provide for rotation of the force vector F in a clockwise direction. Thus, the slots 38 and the ports 34 and 36 cooperate to provide for movement of the ring gear 14 to in turn cause rotation of the force vector F so that the actuator 10 is in effect self-commutating.

In the operation of the actuator 10, fluid from the source 30 is supplied to the inlet passage 27 and exhausted from the passage 28 for return to the source 30 so as to pressurize the chambers 25a–f in sequence and exhaust diametrically opposite chambers in the same sequence. This sequential pressurization of the displacement chambers causes the force vector F to rotate at a speed related to the magnitude of the force vector which is in turn determined by the magnitude of the pressure at the inlet passage 27. Since it is only necessary to move the ring gear 14 in a very small circle, namely, one having a radius e, relatively small forces f are effective to accelerate the actuator 10. As a result, low input pressures at the passage 27 can be utilized for operating the actuator 10. Accordingly, the actuator 10 can be utilized for converting the output of a fluidics device, such as a fluid amplifier, directly to rotary motion. The direction of rotation of the output shaft 11 is readily reversed, when desired, by merely connecting the passage 28 to the output side of the pressure source 30 and connecting the passage 27 to the discharge side of the pressure source 30. This capability of the actuator 10 to readily provide for rotation of the output shaft 16 in a reverse direction is achieved by virtue of the symmetrical arrangement of the ports 34 and 36 which communicate with the displacement chambers 25a–f.

The transmission ratio, namely, the ratio of force vector revolutions for each revolution of the output shaft 11, depends on the relative numbers of teeth 18, 19, 20 and 21. Accordingly, the actuator 10 can readily be structured to achieve a desired transmission ratio and can be manufactured in relatively small sizes to obtain high output torques for the reasons heretofore mentioned.

A modified form of the actuator of this invention, indicated generally at 10a, is illustrated in FIGS. 7–9, inclusive, as including a housing or support frame 17a in which a pair of identical stationary gears 39 are mounted. The gears 39 are arranged in an axially aligned relation and provided with identical inwardly extending teeth 40 which mesh with teeth 41 on a ring gear 42. Teeth 43 on the ring gear 42 mesh with teeth 44 on an output gear 45 supported on needle bearings 45a carried by the stationary gears 39. The stationary gears 39 and the output gear 45 are concentric and have an axis 46 shown in FIG. 8. The ring gear 42 is disposed for floating movement and has an axis 47 which is eccentric with respect to the axis 46 by the distance indicated at e in FIG. 8.

The ring gear 42 is supported on an annular bearing assembly 48 which is in turn supported on a motion transmitting gear 49 which is concentric with ring gear 42 and is shaped like the stationary gear 13 in the actuator 10. The bearings 48 enable rotation of ring gear 42 relative to gear 49 but transmit epicyclic movement of gear 49 to gear 42. The gear 49 meshes with a gear 50 having the same number of teeth as the gear 49 and shaped like the output gear 14 in the actuator 10. The gear 50 is affixed to a hollow shaft 51 by suitable means such as a key 52 so that the gear 50 is maintained in a fixed position with respect to the shaft 51. Vanes 53, pivotally attached at one of their ends to the gear 50, have their opposite ends slidably supported in slots 54 formed in the gear 49 so as to form a plurality of displacement chambers 55a–h extending about the gear 50 and disposed between the gear 50 and the gear 49. When the displacement chambers 55a–h are sequentially pressurized on one side of the gear 49 and discharged in the same sequence on the diametrically opposite side of the gear 49, the gear 49 is caused to orbit, like the ring gear 14 is caused to orbit in the actuator 10. Thus, in the illustrated embodiment of the invention shown in FIG. 8, with the displacement chambers 55a–c connected to a source of fluid under pressure, and with the displacement chambers 55e–g on the diametrically opposite side of the gear 49 connected to exhaust, a force vector F is developed which is applied to the gear 49 and directed as shown in FIG. 8.

The force vector F will move the gear 49 to a position in which the next chamber 55h will be pressurized, supply of fluid to chamber 55c will be discontinued, and force vector F will be caused to rotate in a counterclockwise direction. This cycle is continuously repeated causing the axis 47 of the gear 49 to orbit about the axis 46, with this orbital movement being transmitted from the gear 49 to the ring gear 42 through the bearings 48. This orbital movement of the ring gear 42 causes the ring gear 42 to mesh successively with the stationary gear teeth 40 in a direction extending counterclockwise about the axis 46 as viewed in FIG. 9. However, since there are less teeth 41 on the ring gear 42 than there are teeth 40 on the stationary gears 39, the ring gear 42 will also rotate in a counter direction, namely, clockwise as viewed in FIG. 9, with this rotation taking place on the bearings 48. By virtue of the meshing engagement of the ring gear teeth 43 with the output gear teeth 44, rotation of the ring gear 42 causes rotation in the same direction of the output gear 45.

Fluid is supplied to the displacement chambers 55a–h through an inlet passage 56 formed in the shaft 51, and fluid is exhausted from the displacement chamber through an output passage 57 formed in the shaft 51. The inlet passage 56 communicates, through connecting passages 59, with two groups of slot-shape inlet ports 58 disposed in a circular formation about the axis 46 and formed in the stationary gears 39 on opposite sides of the gear 49. Similarly, the exhaust passage 57 communicates, through connecting passages 61, with two groups of slot-shape discharge ports 60 formed in the gears 39. The ports 58 and 60 are formed in the inner faces 62 of the stationary gears 39 which are positioned in sliding fluid tight engagement with a pair of plates 63 which are secured to opposite sides of the ring gear 49 so that the plates 63 overlap the gear 50, as shown in FIG. 7, and define the sides of the displacement chambers 55a–h.

Thus, in order to provide communication between the ports 58 and 60 and the displacement chambers 55a–h, fluid must flow through the side plates 63. For this purpose, the plates 63 are formed with pairs of aligned slots 64 which terminate at their inner ends at the displacement chambers and extend outwardly a distance sufficiently to overlap the ports 58 and 60, as shown in FIG. 9. The slots 64 are arranged in a circular formation about the gear 49 and correspond in number to the number of displacement chambers, namely, eight in the illustrated embodiment of the actuator 10a. The slots 64 are located so that in any position of the gear 49, some of the slots 64 on one side of gear 49 will overlap some of the pressure ports 58 and some of the slots 64 on the opposite side of gear 49 will overlap some of the chamber discharge ports 60. The slots 64 are also located so that the ones which overlap the pressure ports 58, in any position of the gear 49, will be angularly spaced from the points at which the ring gear teeth 43 engage the output gear teeth 44 and the ring gear teeth 41 engage the stationary gear teeth 40. In the position of the gear 49 illustrated in FIG. 9, three of the slots 64 on one side of the gear 49 overlap and communicate with the pressure ports 58 for the displacement chambers 55a–c, inclusive. The slots 64 on the diametrically opposite side of the gear 49 overlap and communicate with the discharge ports 60 for the displacement chambers 55d–e, inclusive. The slots 64 for the chambers 55c and 55h are positioned between the corresponding ports 58 and 60.

In one structural embodiment of the actuator 10a, there are eighty four teeth 41 on the ring gear 42, eighty seven teeth 40 on each ring gear 39, ninety five teeth 43 on the ring gear 42 and ninety eight teeth 44 on the output gear 45. This results in a transmission ratio of 250:1. Such an actuator is capable of applying a torque of 25,000 in. lbs. when supplied with fluid at 2250 p.s.i. and is capable of rotating the output gear 45 at a speed of 14 r.p.m.'s.

The embodiment 10a illustrates that in the actuator of this invention the displacement chambers can be located radially inwardly of the ring gear as well as radially outwardly, as in the actuator 10. Also, the displacement chambers do not need to communicate directly with the ring gear, as illustrated in the actuator 10a, so long as the forces developed therein are operatively transmitted to the ring gear so as to cause epicyclic movement thereof, as through the intermediary of the motion transmitting gear 49 in the actuator 10a. The actuator 10a also illustrates that in some instances rotation as well as orbiting movement of the ring gear is desirable such as when high torques are to be developed in an external output gear usable to rotate an aircraft wing flap.

One of the inherent advantages in the actuator of this invention, which is obtained by virtue of the use of the floating arrangement of the ring gear, is the reduction in the large separation forces normally involved with meshing gears which rotate about fixed axes. The high pressures heretofore generated on the meshing teeth in gears rotating about fixed axes necessitated precision machined teeth and required high input forces. Due to the avoidance of these separation forces in the actuator of this invention, less precise configuration of the gear teeth is required thereby reducing manufacturing costs. The relationship between floating gear teeth and gear teeth which rotate about a fixed axis is illustrated in FIG. 10 which is an enlarged fragmentary view of the teeth 18 and 19 which mesh in the output gear 11 and the ring gear 14, respectively, in the actuator 10.

FIG. 10 illustrates that the gears 11 and 14 would contact at point 86 if both gears were mounted on fixed centers. The basic tooth shape of the gear teeth 18 and 19 is a twenty degree pressure angle involute producing a force or pressure line at seventy degrees to the line 87 connecting the gear centers. The major component of the force between the two gear teeth which are contacting at point 86 would represent torque load. The minor component would be parallel to the line 87 and would represent a separation force which would load a center bearing if the ring gear 14 were mounted on a center bearing. However, since gear 14 has no fixed axis of rotation, and no center bearing, the two gears 11 and 14 will separate at point 86 resulting in successive contact points 88, 90, 92 and finally 94 where the pressure line will be totally perpendicular to the contacting surface representing 100% torque and zero separation force. If gears 11 and 14 were to separate too far, the force would be in the reverse direction causing them to return.

In FIGS. 11 and 12, still another embodiment of the actuator of this invention, indicated generally at 10b, is illustrated which has a fluid inlet passage 102 and an exhaust passage 104 corresponding to the passages 27 and 28, respectively, in the actuator 10. The actuator 10b includes a housing 100 in which a pair of annular passages or ports 106 and 106a are formed so that they communicate with inlet passage 102. A pair of annular passages or ports 108 and 108a are also formed in the housing 100 at positions concentric with the passages 106 and 106a and at positions connected to the exhaust passage 104.

Stationary gears 110 and 110a are formed integral with the housing 100 and have identical aligned external gear teeth which may number one hundred. Output shaft 112 is mounted for rotation in housing 100 and forms an output gear 114 having external teeth which may number ninety five.

A floating ring gear 116 is mounted between an internal circumference of housing 100 and output shaft 112 and experiences epicyclic motion relative to housing 100 and shaft 112. The ring gear 116 has three sets of internal teeth 118, 118a and 120 which mesh respectively with the teeth of external gears 110 and 110a and 114. The number of gear teeth in each of internal ring gears 118, 118a may number one hundred ten. The number of teeth 120 may number one hundred five.

Six vanes 122a–f, inclusive, are reciprocally mounted in slots in the ring gear 116 and are spring urged against an internal circumference of housing 100 so as to divide the space around ring gear 116 into six fluid displacement chambers. Six ports 124a–f are formed through ring gear 116 at positions equally spaced about a common circumference. Six passages 126a–f are formed in ring gear 116 and connect respectively ports 124a–f to the outer circumference of ring gear 116 and are spaced so that one port is connected to each fluid chamber between vanes 122a–f.

Ports 124a–f move in an epicylic motion with ring gear 116 and as a result some of the ports are at any given time in registry with input passages 106, 106a and others are in registry with discharge passages 108, 108a. In the illustrated embodiment 10b, the ports are arranged so that at any one time one half of the fluid compartments are pressurized and the other half of the fluid compartments are exhausted. This causes a movement of gear 116 which changes a pressure connection of one port to an exhaust connection and changes an exhaust connection from another port to a pressure connection which results in further movement of gear 116 and so forth resulting in a self-commutated epicyclic motion and rotation of force vector F. Since ring gear 116 is floating, it enjoys the advantages of minimum separation force for those reasons previously explained for the actuators 10 and 10a.

In the operation of the actuator 10b, one or more of the ports 124a–f is always in registry with a portion of the annular pressure ports 106, 106a on one side of the ring gear 116 and one or more of the ports 124a–f on the diametrically opposite side of the ring gear 116 is always in registry with a portion of the annular discharge ports 108, 108a. As a result, the force vector F is continually being applied to the ring gear 116 so as to move it in an epicyclic path about the output shaft 112. In the illustrated form of the actuator 10b, the ports 124b, c, and d register with the pressure ports 106, 106a so that the displacement chambers extending from the vane 122a in a clockwise direction to the vane 122d are supplied with pressure fluid. The other three displacement chambers communicate with the discharge ports 108, 108a so that the result is a force vector F directed as shown in FIG. 12 and located midway between the vanes 122a and 122d. It should be noted that the inlet and outlet ends of each of the passages 126a–f are spaced about ninety degrees apart on the circumference of ring gear 16. This provides for the force vector F being spaced about ninety degrees from the points of engagement between the ring gear with the output and stationary gears.

The force vector F shown in FIG. 12 will move the ring gear 116 to a new position in which different ones of the displacement chambers will be pressurized and exhausted so that the force vector F will be rotated in one direction about the output shaft 112. With the actuator 10b operating on air supplied to the inlet passage 102 at about 10 p.s.i.g., 70 in. lbs. of torque will be produced at the output shaft 112 running at 5 r.p.m. output speed. In the illustrated embodiment of the invention the transmission ratio is about 98:1.

The actuators 10, 10a and 10b, heretofore described, are all self-commutating, by which is meant, the epicyclic motion of the ring gear 14 is utilized to produce the desired rotation of the force vector F. It is to be understood however that the actuator of this invention can be externally commutated as illustrated schematically in FIG. 13, in which an actuator 150 is shown being utilized as an alternator pump for operating an actuator 160 which functions as a motor. The pump 150 delivers pulsating pressures in fluid filled lines 152, 154 and 156 in which membranes 152a, 154a and 156a are located. The membranes are elastic in nature, and do not permit fluid transfer therethrough so that the fluid from alternator 150 is isolated from the fluid of motor 160. This is advantageous for numerous applications including aircraft usage where the pump 150 might be located interiorly of the aircraft under one set of conditions while the motor 160 might be located in a position exterior of the aircraft where the conditions are quite different. Hence different fluids for pump 150 and motor 160 are advantageous.

In the schematic, an epicyclic member 162 of pump 150 is rotatably driven by an externally driven shaft 164 causing the vanes 166 to reciprocate in slots 168. As will be appreciated by those skilled in the art, this will cause a pulsating pressure in lines 152, 154 and 156. This pulsating pressure is delivered to individual vane chambers of an epicyclic motor 160 which may be like that of the embodiments 10, 10a or 10b with an individual line going to each vane chamber. A relief valve 170, a supply tank 172, and a check valve 174 may be connected to the line 152 to perform temperature compensation in the conventional manner.

From the above description it is seen that this invention provides actuators 10, 10a and 10b in which three components, namely, an output gear mounted for axial rotation, a stationary gear mounted in a concentric relation with the output gear, and an eccentric floating ring gear are relatively arranged so that rotational movement of the output gear is obtained directly in response to fluid actuation of the ring gear, and a desired transmission ratio is obtained without the necessity of any additional gearing. These components are formed of metal or an equivalent rigid material. In all embodiments, fluid displacement chambers are arranged so that they extend about the output member axis and transmit forces developed therein to the ring gear member so that expansion of some of the chambers and contraction of others of the chambers results in the application of the force vector F to the ring gear member so that it experiences epicyclic movement relative to the other gear components. The displacement chambers are sequentially pressurized and exhausted in a direction extending about the output gear axis so as to provide for rotation of the force vector F. The relative numbers of the teeth on the gears determines the transmission ratio, and the same number of teeth can be employed on the ring gear and the stationary gear, as illustrated by the actuator 10. It is to be importantly noted that this particular arrangement of the ring gear and the stationary gear is advantageous in an actuator, and that such an actuator can be powered by forces other than those that are fluid pressure generated, such as illustrated in the aforementioned copending applications. In such an embodiment, all points on the ring gear move at the same velocity relative to the axis of the output gear.

In all of the actuators 10, 10a and 10b, stationary fluid passages are provided which terminate in pressure and discharge ports for the displacement chambers. The ports are disposed in a circular formation about the output gear axis so that the functions of the ports can readily be reversed to thereby achieve reversed rotation of the output shaft. Self-communication is readily achieved in the actuators by the cooperation of these ports with the inlet slots for the displacement chambers which are disposed so that they sequentially register with the pressure and discharge ports on movement of the ring gear which is sometimes referred to as the orbital member. Since it is the coaction of the fluid pressure developed moving force vector, the driving engagement of the stationary and ring gears, and the driving engagement of the ring and output gears which produces the desired transformation of fluid under pressure to rotary motion, it is to be understood that it is within the scope of this invention to accomplish the driving engagement of the actuator components without the use of gear teeth, although this is preferred. For example, frictional engagements of the components can be employed.

What is claimed is:
1. An actuator comprising:
a rotatably mounted output member having an axis,
a stationary member arranged in a concentric relation with said output member,
a floating ring member drivingly engaged with said stationary member at one point on said ring member and drivingly engaged with said output member at another point on said ring member,
said ring member having an axis arranged eccentric with respect to the axis of said output member,
means providing a moving force vector applied to said ring member in a direction substantially perpendicular to said stationary and output member axis and moving in one direction about said axis to cause said ring member to move in an epicyclic path such that the axis thereof is orbited about said output member axis, said last mentioned means comprising means forming a plurality of displacement chambers extending about said output member axis and arranged so that forces developed therein are transmitted to said ring member so that expansion of some of said chambers and contraction of others of said chambers results in the application of said force vector to said ring member, said chambers being disposed between a pair of said members and means on said pair of members preventing relative rotation thereof, and means providing for sequential pressurizing of said chambers proceeding in said one direction.

2. An actuator according to claim 1 wherein said stationary member has a full circle of gear teeth, said output member has a full circle of gear teeth, and said ring member has a first full circle of gear teeth which are in meshing engagement at said one point with said stationary gear teeth and a second full circle of gear teeth which are in meshing engagement with said output gear teeth at another point on said ring member.

3. An actuator according to claim 2 wherein said means providing for sequential pressurizing of said displacement chambers is responsive to said movement of said ring gear member.

4. An actuator according to claim 2 wherein said means providing for sequential pressurizing of said displacement chambers includes stationary passage means terminating in pressure and discharge ports for said chambers, and means movable with said ring gear for sequentially communicating said ports with said chambers.

5. An actuator according to claim 4 wherein said ports are arranged in generally circular formations extending about said output member axis.

6. An actuator comprising:

a housing, a stationary gear mounted on said housing and having teeth disposed on a pitch circle of predetermined diameter, a rotatably mounted output gear having teeth disposed on a pitch circle of predetermined diameter, said gears being arranged in a concentric relation, floating ring gear means having first teeth disposed on a pitch circle of a diameter different from the diameter of said stationary gear pitch circle, at least one of said ring gear means first teeth being drivingly engaged with at least one of said stationary gear teeth, said ring gear means having second teeth disposed on a pitch circle of a diameter different from the diameter of said output gear pitch circle, at least one of said ring gear means second teeth being drivingly engaged with at least one of said output gear teeth, said ring gear means having an axis arranged eccentric with respect to the axis of said stationary and output gears and being mounted for orbiting movement in which the axis thereof moves about said stationary and output gear axis, means for applying a moving force vector to said ring gear means moving in a path extending in one direction about said gear means so as to produce said orbiting movement to thereby provide for rotation of said output gear, said last-mentioned means comprising relatively non-rotatable means in said housing forming a plurality of fluid displacement chambers extending about said stationary and output gear axis, and means for supplying fluid to successive ones of said chambers so as to develop said force vector.

7. An actuator according to claim 6 wherein said means for supplying fluid to said chambers includes fluid inlet passage means in said housing terminating in a plurality of pressure ports, surface means on said ring gear means disposed in a covering relation with said pressure ports, said surface means having openings therein communicating with said chambers and successively registerable with said ports in response to said movement of said ring gear means.

8. An actuator according to claim 7 further including fluid discharge passage means in said housing terminating in discharge ports arranged relative to said surface means for successive registration with said openings therein.

9. An actuator according to claim 8 wherein said pressure and discharge ports are arranged in side-by-side circular formations so that a pressure port and a discharge port are provided for each of said chambers.

10. An actuator according to claim 9 further including a plurality of vane members arranged so that they coact with said surface means, said ring gear means and said stationary gear so as to form said displacement chambers.

11. An actuator according to claim 6 wherein said stationary gear teeth are directed inwardly, said ring gear first teeth extend radially outwardly, and said means forming said displacement chambers includes said stationary gear teeth and said ring gear first teeth which coact to locate said chambers between said stationary gear and said ring gear means.

12. An actuator according to claim 6 further including a shaft, a pair of coacting gear members one of which is mounted on said shaft and the other one of which is floatingly mounted about said one, said other one of said pair being connected to and forming a part of said ring gear means for floating movement therewith and rotation relative thereto, and wherein said means forming said displacement chambers includes said pair of coacting gear members.

13. An actuator according to claim 12 wherein said means for supplying fluid to successive ones of said chambers includes passage means extending through said shaft and terminating in ports located adjacent said pair of coacting gears, and means movable with said other one of said pair of gears having inlet openings for said chambers arranged for successive registry with said ports in response to said orbiting movement of said ring gear means.

14. An actuator according to claim 6 wherein said housing extends about and is disposed adjacent said ring gear means, and wherein said means forming a plurality of fluid displacement chambers includes said housing and said ring gear means and a plurality of vanes which are slidably mounted thereon and extend therebetween.

15. An actuator according to claim 14 wherein said means for supplying fluid to said chambers includes fluid inlet passage means in said housing terminating in an annular pressure port, said ring gear means having a plurality of passages formed therein, each of which communicates at one end with one of said chambers, the opposite ends of said passages being positioned for successive registry with said pressure port in response to said orbiting movement of said ring gear means.

16. An actuator according to claim 15 wherein the ends of each of said passages in said ring gear means are angularly spaced apart in a direction circumferentially thereof.

17. An actuator according to claim 15 further including fluid discharge passage means in said housing terminating in an annular discharge port for said chambers disposed adjacent said pressure port and registerable with said opposite ends of said passages, said discharge port being located relative to said passages so that when one of said chambers communicates with said pressure port a diametrically opposite chamber communicates with said discharge port.

18. An actuator comprising:

a stationary gear member having a predetermined number of teeth arranged on a pitch circle of predetermined diameter,
a rotatably mounted output member having an axis,
said members being arranged in a concentric relation,
a floating gear member having an axis arranged eccentric with respect to the axis of said stationary and output members and having a set of teeth at least one of which is drivingly engaged with said stationary gear member at one point on said floating gear member, the number of teeth in said set being equal to said predetermined number and being arranged on a pitch circle having a diameter different from said predetermined diameter, and
means providing a moving force vector applied to said floating gear member in a direction substantially perpendicular to said stationary and output member axis and moving in one direction about said axis to cause said floating gear member to move in an epicyclic path relative to said stationary and output members such that said floating gear member is orbited about said stationary and output member axis,
said floating gear member being arranged in driving engagement with said output member to provide for rotation thereof in response to said movement of said floating gear member.

19. An actuator according to claim 18 wherein the arrangement of said teeth on pitch circles of different diameters provides for a space between the teeth on said stationary and floating gears, means extending between said gears and through said space dividing said space into a plurality of fluid displacement chambers, and means for directing fluid into said chambers so as to cause said movement of said floating gear.

20. An actuator according to claim 19 wherein said means extending between said teeth comprises slidably mounted vane members.

21. An actuator according to claim 18 further including a housing on which said stationary gear is mounted, fluid passage means in said housing terminating in a plurality of ports disposed in a substantially circular formation about the axis of said output gear member, and plate means secured to said floating gear member having openings therein communicating with said chambers and registerable with said ports for admitting fluid to and exhausting fluid from said chambers.

22. An actuator according to claim 21 wherein said fluid passage means includes inlet passage means terminating in a plurality of pressure ports and discharge passage means terminating in a plurality of discharge ports, a fluid pressure source connected to said inlet passage means, and wherein said openings in said plate means are arranged so that said movement of said floating gear causes said openings to register in a predetermined sequence with said pressure and discharge ports so that successive ones of said chambers proceeding in said one direction are connected to said pressure and discharge ports so that when one chamber is connected to a pressure port, a diametrically opposite chamber is connected to a discharge port.

23. An actuator according to claim 1 wherein said means providing for sequential pressurizing of said chambers includes a plurality of fluid passages connected to said chambers and means for sequentially pressurizing the fluid in said passages.

24. An actuator according to claim 23 further including pump means connected to said fluid passages.

25. In an actuator which includes means forming a plurality of expansible and contractible fluid displacement chambers, a rotatable member driven in response to sequential expansion and contraction of said chambers, a non-rotatable orbital member movable in an orbital path in response to said sequential expansion and contraction of said chambers, a port member disposed adjacent said orbital member and provided with fluid inlet and exhaust ports arranged in a predetermined pattern, and means responsive to movement of said orbital member in said orbital path providing for a selective communication of said inlet and exhaust ports with said displacement chambers so as to provide for said sequential expansion and contraction thereof.

26. An actuator according to claim 25 further including tooth means on said orbital member, and a toothed member arranged in a 1:1 tooth meshing relation with said orbital member so as to prevent rotation thereof.

27. An actuator according to claim 26 wherein said orbital member and said port member are arranged in a proximate side-by-side relation.

28. An actuator according to claim 27 wherein said port pattern provides an inlet port and an adjacent exhaust port for each of said chambers.

29. An actuator comprising a housing, means including an orbital member in said housing forming a plurality of fluid displacement chambers, coacting means on said housing and said orbital member restraining said orbital member against rotation in said housing, means in said housing forming fluid inlet and exhaust ports arranged in a predetermined pattern and disposed adjacent said orbital member, said ports being selectively communicated with said chambers in response to orbital movement of said orbital member.

30. An actuator according to claim 29 wherein said orbital member is mounted for movement between a pair of substantially parallel fixed position faces in said housing, said ports being disposed in at least one of said faces for opening and closing in response to orbital movement of said orbiting member.

References Cited

UNITED STATES PATENTS

| | | | |
|---|---|---|---|
| 2,423,507 | 7/1947 | Lawson | 103—132 |
| 2,695,597 | 11/1954 | Griffiths | 91—56 |
| 2,871,831 | 2/1959 | Patin | 103—130 |
| 2,989,951 | 6/1961 | Charlson | 103—130 X |
| 3,106,163 | 10/1963 | Mosbacher | 103—130 X |
| 3,139,835 | 7/1964 | Wilkinson | 103—130 X |
| 3,288,078 | 11/1966 | Monroe | 103—130 |
| 3,302,584 | 2/1967 | McDermott | 103—130 |
| 3,339,460 | 9/1967 | Birdwell | 103—130 X |
| 3,381,668 | 5/1968 | Agren | 103—130 X |

EVERETTE A. POWELL, JR., Primary Examiner

U.S. Cl. X.R.

103—130

UNITED STATES PATENT OFFICE
CERTIFICATE OF CORRECTION

Patent No. 3,516,765     Dated    June 23, 1970

Inventor(s)    George I. Boyadjieff et al.

It is certified that error appears in the above-identified patent and that said Letters Patent are hereby corrected as shown below:

Column 3, cancel lines 41 through 45; line 46, cancel "stantially the line 12-12 therein;". Column 8, cancel lines 36 through 75. Column 9, cancel lines 1 through 47; line 48, cancel "10, 10a and 10b" and insert -- 10 and 10a --. Column 10, lines 7 and 39, cancel "10, 10a and 10b" and insert -- 10 and 10a --. Column 12, all the matter beginning with line 45 to and including line 73, should be canceled. Column 12, line 74, "18." should read -- 14. --. Column 13, line 27, "19." should read -- 15. --; and "18" should read -- 14 --; line 35, "20." should read -- 16. --; and "19" should read -- 15 --; line 38, "21." should read -- 17. --; and "18" should read -- 14 --; line 47, "22." should read -- 18. --; and "21" should read -- 17 --; line 61, "23." should read -- 19. --. Column 14, line 3, "24." should read -- 20. --; and "23" should read -- 19 --; line 5, "25." should read -- 21. --; line 19, "26." should read -- 22.--; and "25" should read -- 21 --; line 23, "27." should read -- 23. --; and "26" should read -- 22 --; line 29, "29." should read -- 25 --; and line 39, "30." should read -- 26. --; and "29" should read -- 25 --. In the heading to the printed specification, line 9, "30 Claims" should read -- 26 Claims --.

Signed and sealed this 14th day of March 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,516,765          Dated June 23, 1970

Inventor(s)    George I. Boyadjieff et al.

It is certified that error appears in the above-identified patent and that said Letters Patent are hereby corrected as shown below:

Column 14, line 26, "28." should read -- 24. --; same line 26, "27" should read -- 23 --.

Signed and sealed this 15th day of August 1972.

(SEAL)
Attest:

EDWARD M. FLETCHER, JR.          ROBERT GOTTSCHALK
Attesting Officer                Commissioner of Patents